US007391169B2

(12) United States Patent
Huang et al.

(10) Patent No.: US 7,391,169 B2
(45) Date of Patent: Jun. 24, 2008

(54) SYSTEM AND METHOD FOR ANALOG VOLTAGE PROCESSING IN WIDE RANGE FOR COLD-CATHODE FLUORESCENT LAMP

(75) Inventors: Jianfeng Huang, Shanghai (CN); Liqiang Zhu, Shanghai (CN); Zhen Zhu, Shanghai (CN); Lieyi Fang, Shanghai (CN)

(73) Assignee: On-Bright Electronics (Shanghai) Co., Ltd., Shanghai ( * ) Notice: Subject to any disclaimer, the term of this patent is extended or adjusted under 35 U.S.C. 154(b) by 339 days.

(21) Appl. No.: 11/357,350

(22) Filed: Feb. 17, 2006

(65) Prior Publication Data

US 2007/0177408 A1 Aug. 2, 2007

(30) Foreign Application Priority Data

Jan. 28, 2006 (CN) ........................ 2006 1 0023743

(51) Int. Cl.
*H05B 37/02* (2006.01)
*H02M 11/00* (2006.01)

(52) U.S. Cl. ......................... 315/291; 315/299; 327/103

(58) Field of Classification Search ............. 315/209 R, 315/226, 291, 299; 327/100, 103
See application file for complete search history.

(56) References Cited

U.S. PATENT DOCUMENTS 5,367,248 A * 11/1994 Lin ............................ 323/312
5,557,220 A * 9/1996 Araya et al. .................. 327/28
5,815,012 A * 9/1998 Rivoir et al. ................ 327/103
6,593,709 B2 * 7/2003 Lee et al. .................... 315/302

* cited by examiner

*Primary Examiner*—Thuy Vinh Tran
(74) *Attorney, Agent, or Firm*—Jones Day

(57) ABSTRACT

System and method for processing analog voltage for cold-cathode fluorescent lamp. The system includes a voltage-to-current converter configured to receive an input analog voltage signal and generate a first current signal, and a current processing component configured to receive the first current signal and a predetermined current and generate a second current signal. Additionally, the system includes a current-to-voltage converter configured to receive the second current signal and generate an output analog voltage signal, and a dimming controller configured to receive the output analog voltage signal and generate a control signal for driving at least a cold-cathode fluorescent lamp. The voltage-to-current converter, the current processing component, and the current-to-voltage converter are configured to be biased between a first power supply voltage level and a second power supply voltage level.

33 Claims, 7 Drawing Sheets

SYSTEM AND METHOD FOR ANALOG VOLTAGE PROCESSING IN WIDE RANGE FOR COLD-CATHODE FLUORESCENT LAMP

CROSS-REFERENCES TO RELATED APPLICATIONS

This application claims priority to Chinese Patent Application No. 200610023743.6, filed Jan. 28, 2006, entitled "System and Method for Analog Voltage Processing in Wide Range for Cold-Cathode Fluorescent Lamp," by inventors Jianfeng Huang, Liqiang Zhu, Zhen Zhu, and Lieyi Fang, commonly assigned, incorporated by reference herein for all purposes.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention is directed to analog voltage processing. More particularly, the invention provides a system and method for analog voltage processing in a wide voltage range. Merely by way of example, the invention has been applied to dimming control for one or more cold-cathode fluorescent lamps. But it would be recognized that the invention has a much broader range of applicability.

The cold-cathode fluorescent lamp (CCFL) has been widely used to provide backlight for a liquid crystal display (LCD) module. The CCFL often requires a high alternate current (AC) voltage for ignition and normal operation. Such AC voltage can be provided by a CCFL driver system. The CCFL driver system receives a low direct current (DC) voltage and converts the low DC voltage to the high AC voltage.

Additionally, the CCFL driver system often performs dimming control to adjust brightness of the CCFL. The analog signal used for dimming control can be generated by a controller such as a microcontroller. Often, the analog signal has a wide dynamic range from a low voltage level to a high voltage level. For example, the low voltage level is the ground voltage level, and the high voltage level is close to the supply voltage level. Usually the analog signal needs to be processed in order for the CCFL driver system to perform the dimming control. For example, the signal processing needs to be very precise for a wide range of analog voltage, but such precision often is difficult to achieve.

Hence it is highly desirable to improve techniques for analog voltage processing for dimming control of cold-cathode fluorescent lamp.

BRIEF SUMMARY OF THE INVENTION

The present invention is directed to analog voltage processing. More particularly, the invention provides a system and method for analog voltage processing in a wide voltage range. Merely by way of example, the invention has been applied to dimming control for one or more cold-cathode fluorescent lamps. But it would be recognized that the invention has a much broader range of applicability.

According to one embodiment of the present invention, a system for processing analog voltage for cold-cathode fluorescent lamp is provided. The system includes a voltage-to-current converter configured to receive an input analog voltage signal and generate a first current signal, and a current processing component configured to receive the first current signal and a predetermined current and generate a second current signal. Additionally, the system includes a current-to-voltage converter configured to receive the second current signal and generate an output analog voltage signal, and a dimming controller configured to receive the output analog voltage signal and generate a control signal for driving at least a cold-cathode fluorescent lamp. The voltage-to-current converter, the current processing component, and the current-to-voltage converter are configured to be biased between a first power supply voltage level and a second power supply voltage level. The input analog voltage ranges from the first power supply voltage level to the second power supply voltage level, and the output analog voltage signal ranges from a first output voltage level to a second output voltage level. The output analog voltage signal equals a sum of a first predetermined constant and a product of a second predetermined constant and the input analog voltage signal. The first output voltage level corresponds to the first power supply voltage level based on at least information associated with the first predetermined constant and the second predetermined constant, and the second output voltage level corresponds to the second power supply voltage level based on at least information associated with the first predetermined constant and the second predetermined constant.

According to another embodiment of the present invention, a system for processing analog voltage includes a voltage-to-current converter configured to receive an input analog voltage signal and generate a first current signal. The voltage-to-current converter includes a first transistor, and the first transistor includes a first source and a first drain and is associated with a first current flowing between the first source and the first drain. Additionally, the system includes a first current mirror configured to receive a predetermined current and generate a second current. The second current is proportional to the predetermined current, and the first current is equal to a sum of the second current and the first current signal. Moreover, the system includes a second current mirror configured to receive the first current and generate a third current. The third current is proportional to the first current. Also, the system includes a third current mirror configured to receive the predetermined current and generate a fourth current. The fourth current is proportional to the predetermined current. Additionally, the system includes a current-to-voltage converter configured to receive the third current and the fourth current and generate an output analog voltage signal.

According to yet another embodiment of the present invention, a system for processing analog voltage includes a voltage-to-current converter configured to receive an input analog voltage signal and generate a first current signal. The voltage-to-current converter includes a first transistor, and the first transistor includes a first source and a first drain and is associated with a first current flowing between the first source and the first drain. Additionally, the system includes a first current mirror configured to receive a predetermined current and generate a second current. The second current is proportional to the predetermined current, and the first current is equal to a sum of the second current and the first current signal. Moreover, the system includes a second current mirror configured to receive the first current and generate a third current. The third current is proportional to the first current. Also, the system includes a current-to-voltage converter configured to receive the third current and generate an output analog voltage signal.

According to yet another embodiment of the present invention, a method for processing analog voltage for cold-cathode fluorescent lamp includes receiving an input analog voltage signal, and converting the input analog voltage signal into a first current signal. Additionally, the method includes receiving the first current signal and a predetermined current, processing information associated with the first current signal and the predetermined current, and generating a second current signal based on at least information associated with the first current signal and the predetermined current. Moreover, the method includes receiving the second current signal, converting the second current signal to an output analog voltage signal, receiving the output analog voltage signal, and generating a dimming control signal for driving at least a cold-cathode fluorescent lamp. The converting the input analog voltage signal into a first current signal, the processing information associated with the first current signal and the predetermined current, and the converting the second current signal to an output analog voltage signal are performed by using a first power supply voltage level and a second power supply voltage level. The input analog voltage ranges from the first power supply voltage level to the second power supply voltage level, and the output analog voltage signal ranges from a first output voltage level to a second output voltage level. The output analog voltage signal equals a sum of a first predetermined constant and a product of a second predetermined constant and the input analog voltage signal. The first output voltage level corresponds to the first power supply voltage level based on at least information associated with the first predetermined constant and the second predetermined constant, and the second output voltage level corresponds to the second power supply voltage level based on at least information associated with the first predetermined constant and the second predetermined constant.

According to yet another embodiment of the present invention, a method for processing analog voltage includes receiving an input analog voltage signal, and converting the input analog voltage signal to a first current signal. Additionally, the method includes receiving a predetermined current, and generating a first current based on at least information associated with the predetermined current. The first current is proportional to the predetermined current. Moreover, the method includes processing information associated with the first current and the first current signal, generating a second current equal to a sum of the first current and the first current signal, receiving the second current, and generating a third current based on at least information associated with the second current. The third current is proportional to the second current. Also, the method includes generating a fourth current based on at least information associated with the predetermined current, and the fourth current is proportional to the predetermined current. Additionally, the method includes receiving the third current and the fourth current, generating a fifth current equal to a sum of the third current and the fourth current, and converting the fifth current to an output analog voltage signal.

According to yet another embodiment of the present invention, a method for processing analog voltage includes receiving an input analog voltage signal and converting the input analog voltage signal to a first current signal. Additionally, the method includes receiving a predetermined current, and generating a first current based on at least information associated with the predetermined current. The first current is proportional to the predetermined current. Moreover, the method includes processing information associated with the first current and the first current signal, generating a second current equal to a sum of the first current and the first current signal, receiving the second current, and generating a third current based on at least information associated with the second current. The third current is proportional to the second current. Also, the method includes receiving the third current, and converting the third current to an output analog voltage signal.

Many benefits are achieved by way of the present invention over conventional techniques. For example, certain embodiments of the present invention provide a system and method for processing a voltage analog signal by performing the level shifting and manipulation in current domain. Some embodiments of the present invention can improve precision of analog level shifting and manipulation. Certain embodiments of the present invention can be used for analog signal processing in integrated analog circuitry. For example, the present invention is applied to dimming control in a CCFL backlight driver system. As another example, the dimming control is analog dimming control. Some embodiments of the present invention can be utilized for many applications in which analog voltage level shifting and processing is applied.

Depending upon embodiment, one or more of these benefits may be achieved. These benefits and various additional objects, features and advantages of the present invention can be fully appreciated with reference to the detailed description and accompanying drawings that follow.

DETAILED DESCRIPTION OF THE INVENTION

The present invention is directed to analog voltage processing. More particularly, the invention provides a system and method for analog voltage processing in a wide voltage range. Merely by way of example, the invention has been applied to dimming control for one or more cold-cathode fluorescent lamps. But it would be recognized that the invention has a much broader range of applicability.

Figure 1:
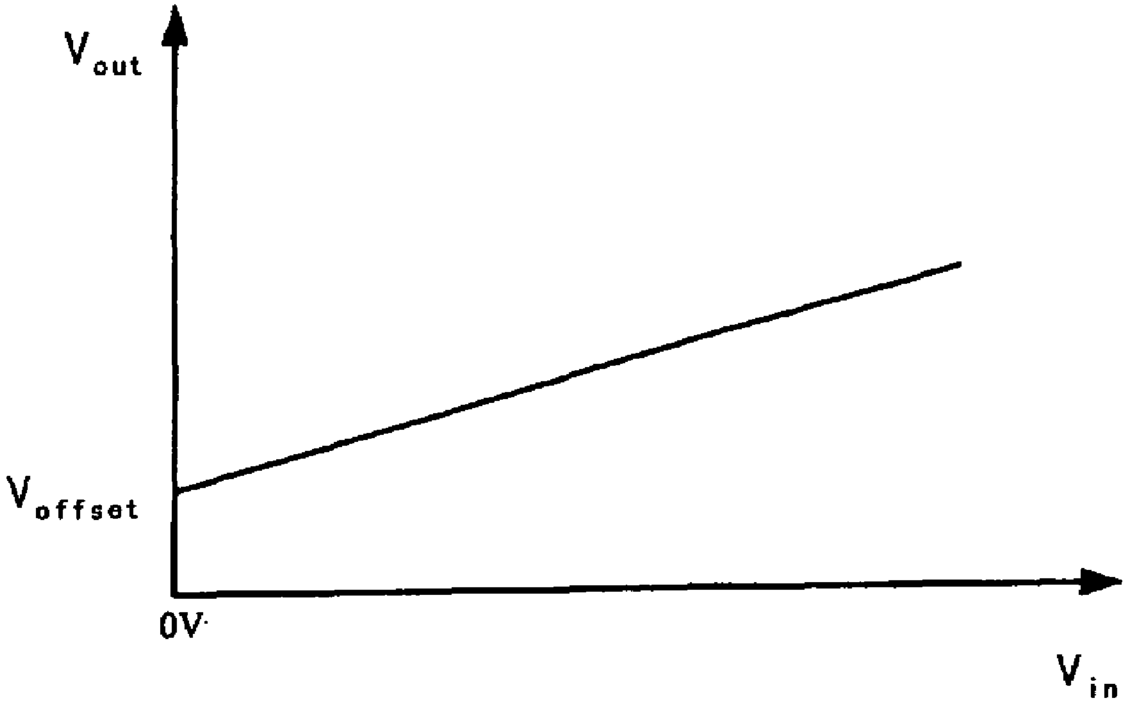
FIG. 1 is a simplified diagram for processing analog voltage for dimming control.

FIG. 1 is a simplified diagram for processing analog voltage for dimming control. The output signal $V_{out}$ is $$V_{out}=V_{offset}+k\times V_{in} \quad \text{(Equation 1)}$$

where $V_{in}$ represents the input analog voltage, and $V_{out}$ represents the output analog voltage. $V_{offset}$ is a DC offset voltage, and k is the gain factor. The range for $V_{out}$ often is optimized for signal control and processing in the CCFL driver system. Accordingly, $V_{offset}$ and k need to be very precise for a wide range of input analog voltage, but such precision often is difficult to achieve.

For analog voltage processing, there are many challenges related to CMOS circuit design. For example, the single power supply is often used for CMOS integrated circuit. The high voltage level is $V_{DD}$, and the low voltage level is the ground voltage. With this power supply constraint, the analog voltage processing often is difficult to achieve for the range from the ground voltage to $V_{DD}$. Additionally, the input impedance often can be so high that some conventional techniques cannot work satisfactorily, such as gain configuration based on inverting operational amplifier. Moreover, the high precision needed for analog voltage level shifting and gain usually makes certain conventional configurations, such as PMOS source follower, unsatisfying.

Figure 2:
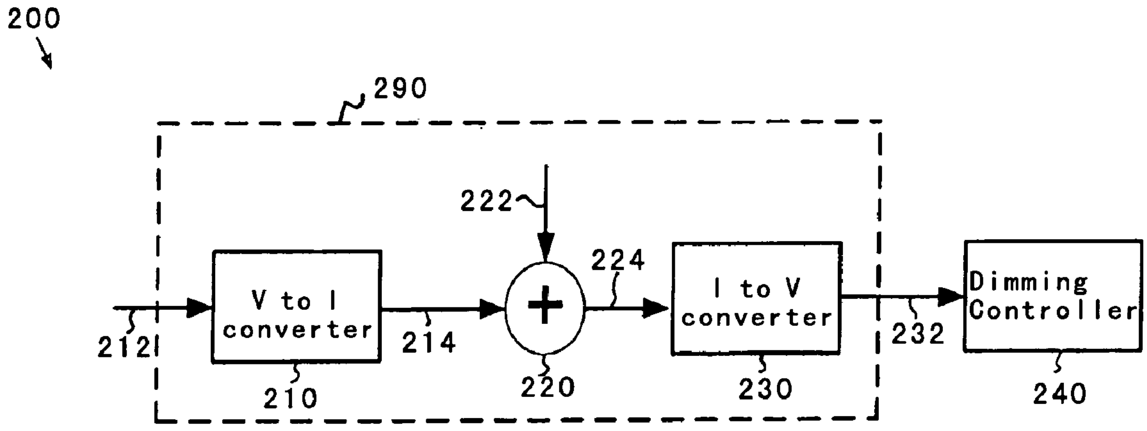
FIG. 2 is a simplified system for processing analog voltage for cold-cathode fluorescent lamp according to an embodiment of the present invention.

FIG. 2 is a simplified system for processing analog voltage for cold-cathode fluorescent lamp according to an embodiment of the present invention. This diagram is merely an example, which should not unduly limit the scope of the claims. One of ordinary skill in the art would recognize many variations, alternatives, and modifications. The system 200 includes a voltage-to-current converter 210, a current combiner 220, a current-to-voltage converter 230, and a dimming controller 240. Although the above has been shown using a selected group of components for the system 200, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and more particularly below.

The voltage-to-current converter 210 receives an input analog voltage signal 212. For example, the input analog voltage signal is represented by $V_{in}$. The input analog voltage signal 212 is converted to an input current signal 214 by the voltage-to-current converter 210. For example, the input current signal is represented by $I_{in}$. In another example, the input current signal 214 is proportional to the input analog voltage signal 212. As shown in FIG. 2, the input current signal 214 is received by the current combiner 220, which also receives an offset current 222. For example, the offset current 222 is represented by $I_{offset}$. In another example, the offset current 222 is a DC current. The input current signal 214 and the offset current 222 are combined to generate an output current signal 224. For example, the output current signal 224 is represented by $I_{out}$. In another example, the output signal 224 is equal to a sum of the input current signal 214 and the offset current 222. The output current signal 224 is received and converted to an output voltage signal 232 by the current-to-voltage converter 230. For example, the output voltage signal 232 is represented by $V_{out}$. In another example, the output voltage signal 232 is proportional to the output current signal 224. The output voltage signal 232 is received by the dimming controller 240, which is a part of a driver system for one or more cold-cathode fluorescent lamps (CCFLs). For example, the dimming controller 240 uses the output voltage signal 232 to adjust brightness of the one or more CCFLs.

As shown in FIG. 2, according to one embodiment of the present invention, a system for processing analog voltage for cold-cathode fluorescent lamp is provided. The system includes a voltage-to-current converter configured to receive an input analog voltage signal and generate a first current signal, and a current processing component configured to receive the first current signal and a predetermined current and generate a second current signal. Additionally, the system includes a current-to-voltage converter configured to receive the second current signal and generate an output analog voltage signal, and a dimming controller configured to receive the output analog voltage signal and generate a control signal for driving at least a cold-cathode fluorescent lamp. The voltage-to-current converter, the current processing component, and the current-to-voltage converter are configured to be biased between a first power supply voltage level and a second power supply voltage level. The input analog voltage ranges from the first power supply voltage level to the second power supply voltage level, and the output analog voltage signal ranges from a first output voltage level to a second output voltage level. The output analog voltage signal equals a sum of a first predetermined constant and a product of a second predetermined constant and the input analog voltage signal. The first output voltage level corresponds to the first power supply voltage level based on at least information associated with the first predetermined constant and the second predetermined constant, and the second output voltage level corresponds to the second power supply voltage level based on at least information associated with the first predetermined constant and the second predetermined constant.

For example, each of the first power supply voltage level and the second power supply voltage level is a DC voltage level. The first power supply voltage level is equal to zero volt. In another example, each of the first predetermined constant and the second predetermined constant is not equal to zero. In yet another example, the voltage-to-current converter, the current processing component, and the current-to-voltage converter are coupled to a single power supply, and the signal power supply is configured to provide the first power supply voltage level and the second power supply voltage level. In yet another example, the second current signal is equal to a sum of the first current signal and the predetermined current. In yet another example, the predetermined current is a DC current. In yet another example, the first current signal is proportional to the input analog voltage signal in magnitude. In yet another example, the output analog voltage signal is proportional to the second current signal in magnitude.

As shown in FIG. 2, according to yet another embodiment of the present invention, a method for processing analog voltage for cold-cathode fluorescent lamp includes receiving an input analog voltage signal, and converting the input analog voltage signal into a first current signal. Additionally, the method includes receiving the first current signal and a predetermined current, processing information associated with the first current signal and the predetermined current, and generating a second current signal based on at least information associated with the first current signal and the predetermined current. Moreover, the method includes receiving the second current signal, converting the second current signal to an output analog voltage signal, receiving the output analog voltage signal, and generating a dimming control signal for driving at least a cold-cathode fluorescent lamp. The converting the input analog voltage signal into a first current signal, the processing information associated with the first current signal and the predetermined current, and the converting the second current signal to an output analog voltage signal are performed by using a first power supply voltage level and a second power supply voltage level. The input analog voltage ranges from the first power supply voltage level to the second power supply voltage level, and the output analog voltage signal ranges from a first output voltage level to a second output voltage level. The output analog voltage signal equals a sum of a first predetermined constant and a product of a second predetermined constant and the input analog voltage signal. The first output voltage level corresponds to the first power supply voltage level based on at least information associated with the first predetermined constant and the second predetermined constant, and the second output voltage level corresponds to the second power supply voltage level based on at least information associated with the first predetermined constant and the second predetermined constant.

Figure 3:
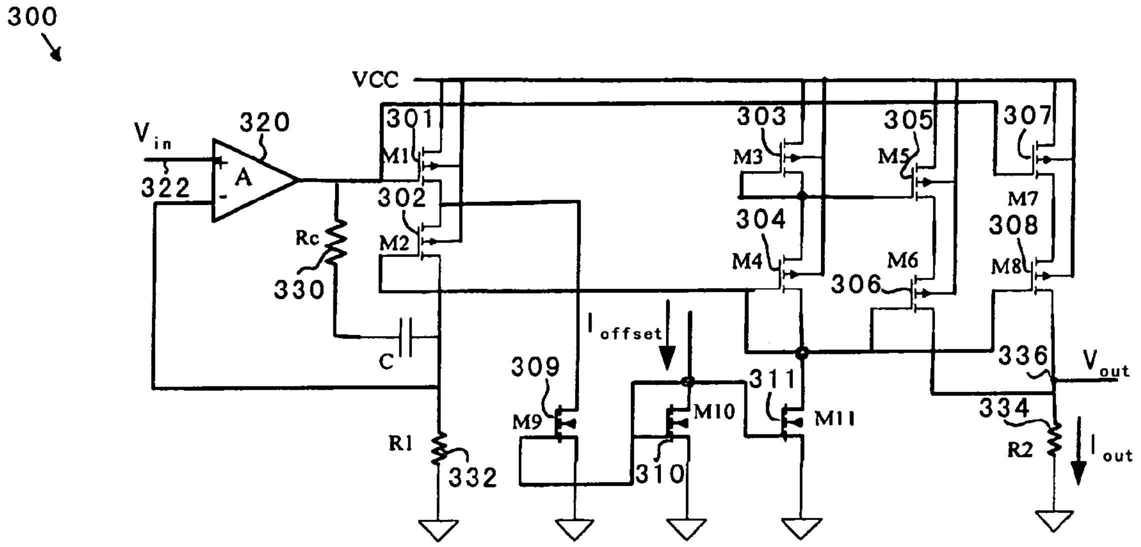
FIG. 3 is a simplified system for processing analog voltage according to an embodiment of the present invention.

FIG. 3 is a simplified system for processing analog voltage according to an embodiment of the present invention. This diagram is merely an example, which should not unduly limit the scope of the claims. One of ordinary skill in the art would recognize many variations, alternatives, and modifications. The system 300 includes transistors 301, 302, 303, 304, 305, 306, 307, 308, 309, 310, and 311, an operational amplifier 320, resistors 330, 332, and 334. Although the above has been shown using a selected group of components for the system 300, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and more particularly below.

An input analog voltage signal 322 is received by the operational amplifier 320. For example, $V_{in}$ represents the input analog voltage signal 322. As shown in FIG. 3, the input analog voltage signal 322 is converted to a current signal by at least the operational amplifier 320, the resistor 332, and the transistors 301 and 302. For example, a current flowing through the transistor 301 is $$I_1 = \frac{V_{in}}{R_1} + N \times I_{offset} \quad \text{(Equation 2)}$$

where $I_1$ represents the current flowing through the transistor 301, and $R_1$ represents the resistance of the resistor 332. Additionally, $I_{offset}$ represents an offset current received by the transistor 310. For example, the offset current is generated by a reference voltage and a resistor. In another example, the offset current received by the transistor 310 is mirrored to the transistor 309. N is the current ratio of the mirror transistors 309 and 310.

As shown in FIG. 3, the current that flows through the transistor 301 is mirrored to the transistor 307 based on a current ratio between the mirror transistors 307 and 301. Additionally, the offset current is mirrored from the transistor 310 to the transistor 305. For example, the offset current is mirrored from the transistor 310 to the transistor 311. The current flowing through the transistor 311 is the same as the current flowing through the transistor 303. Moreover, the current flowing through the transistor 303 is mirrored to the transistor 305.

The current flowing through the transistor 305 and the current flowing through the transistor 307 both are provided to the resistor 334. For example, the sum $I_{out}$ of these two currents is:

$$I_{out} = \frac{1}{R_1} V_{in} + M \times I_{offset} \quad \text{(Equation 3)}$$

where $I_{out}$ represents the output current flowing through the resistor 334. Additionally, M represents a current gain factor. For example, the current gain factor depends on at least the current ratio of the mirror transistors 309 and 310 and the current ratio of the mirror transistors 305 and 310. In another example, the current ratio of the mirror transistors 305 and 310 depends on at least the current ratio of the mirror transistors 311 and 310 and the current ratio of the mirror transistors 305 and 303.

As shown in FIG. 3, the output current $I_{out}$ is converted to an output voltage by the resistor 334. Accordingly, for example, $$V_{out} = \frac{R_2}{R_1} V_{in} + R_2 \times M \times I_{offset} \quad \text{(Equation 4)}$$

where $V_{out}$ represents the output voltage at a node 336, and $R_2$ represents the resistance of the resistor 334. For example, the output voltage is received by a dimming controller, which is a part of a driver system for one or more cold-cathode fluorescent lamps (CCFLs).

According to an embodiment, the gate of the transistor 302 is connected to the gate and the drain of the transistor 304, the drain of the transistor 311, the gate of the transistor 306, and the gate of the transistor 308. As discussed above and further emphasized here, this arrangement is merely an example, which should not unduly limit the scope of the claims. One of ordinary skill in the art would recognize many variations, alternatives, and modifications.

Figure 4:
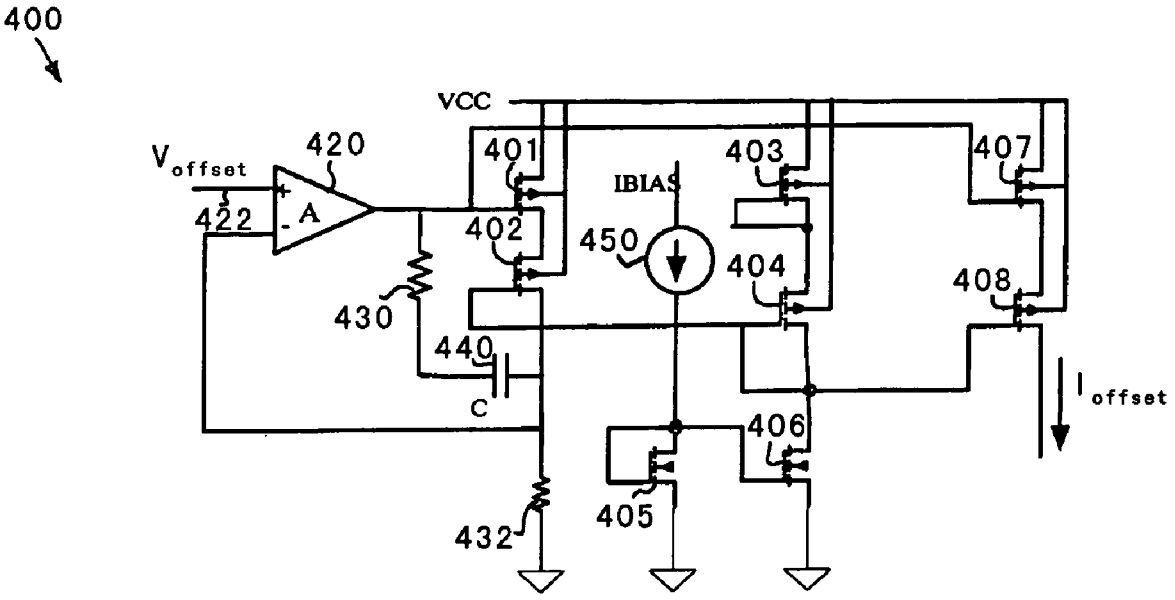
FIG. 4 is a simplified system for generating offset current used by system for processing analog voltage according to an embodiment of the present invention.

FIG. 4 is a simplified system for generating offset current used by system 300 for processing analog voltage according to an embodiment of the present invention. This diagram is merely an example, which should not unduly limit the scope of the claims. One of ordinary skill in the art would recognize many variations, alternatives, and modifications. The system 400 includes transistors 401, 402, 403, 404, 405, 406, 407, and 408, an operational amplifier 420, resistors 430 and 432, a capacitor 440, and a current source 450.

The operational amplifier 420 receives an offset voltage 422. For example, the offset voltage 422 is represented by $V_{offset}$. The offset voltage is converted to a current, which is mirrored to generate an offset current $I_{offset}$. Accordingly, $$I_{offset} = A \times \frac{V_{offset}}{R_{off}} \quad \text{(Equation 5)}$$

where A is the ratio of mirror transistors 407 and 401, and $R_{off}$ is the resistance of the resistor 432.

For example, the offset current $I_{offset}$ is received by the transistor 310. Combining Equations 4 and 5, the following expression can be obtained:

$$V_{out} = R_2 \times A \times M \times \frac{V_{offset}}{R_{off}} + \frac{R_2}{R_1} V_{in} \quad \text{(Equation 6)}$$

$$\text{Additionally, if } \frac{R_2 \times A \times M}{R_{off}} = 1 \quad \text{(Equation 7A)}$$

$$\text{and } \frac{R_2}{R_1} = k \quad \text{(Equation 7B)}$$

$$V_{out} = V_{offset} + k \times V_{in} \quad \text{(Equation 8)}$$

Equation 8 is the same as Equation 1. As shown above, Equation 7A can be satisfied by adjusting $R_2$, $R_{off}$, A, and/or M. Additionally, the gain factor k is determined by $R_2$ and $R_1$ according to Equation 7B. For Equation 8, $V_{offset}$ can be precisely generated by a bandgap voltage reference generator according to an embodiment of the present invention.

Figure 5:
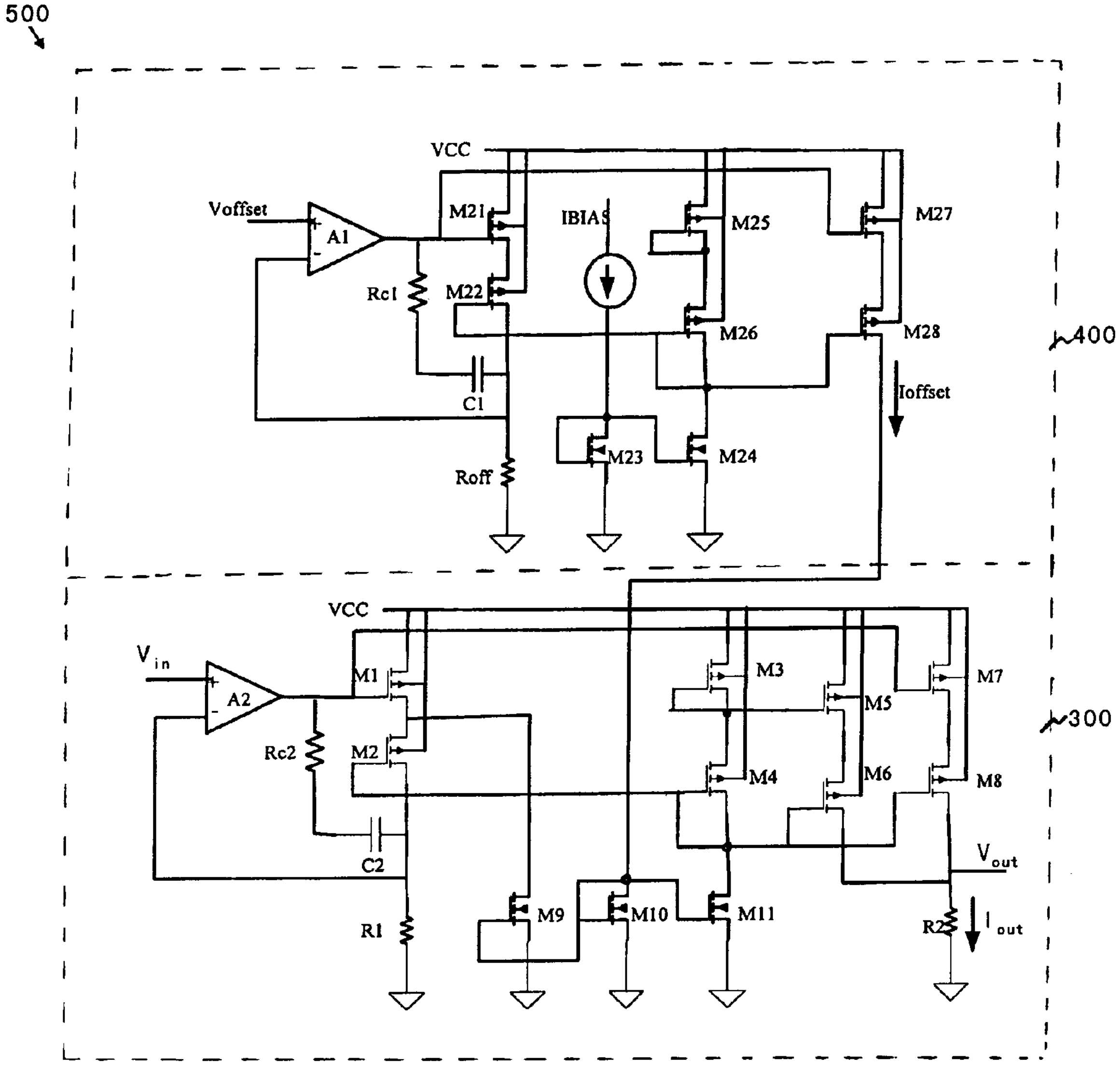
FIG. 5 is a simplified system for generating offset current and processing analog voltage according to an embodiment of the present invention.

FIG. 5 is a simplified system for generating offset current and processing analog voltage according to an embodiment of the present invention. This diagram is merely an example, which should not unduly limit the scope of the claims. One of ordinary skill in the art would recognize many variations, alternatives, and modifications. The system 500 includes the systems 300 and 400. The offset current generated by the system 400 is received by the system 300. Using the offset current, the system 300 generates the output voltage. The output voltage is, for example, received by a dimming controller, which is a part of a driver system for one or more cold-cathode fluorescent lamps (CCFLs). According to an embodiment of the present invention, the system 500 is an exemplary implementation of the system 290, which includes the voltage-to-current converter 210, the current combiner 220, and the current-to-voltage converter 230.

Certain embodiments of the systems 300 and 500 have various advantages. For example, the system 300 and/or 500 can operate properly even if the input voltage is equal or close to the ground voltage. Without the transistors 302 and 309, the current flowing through the resistor 332 and the transistor 301 would become very small or even zero when the input voltage is close or equal to the ground voltage. The very small or zero current flowing through the transistor 301 also makes the transconductance of the transistor 301 very small or become zero. The very small or zero transconductance of the transistor 301 can make the feedback loop formed by the operational amplifier 320, the transistors 301 and 302, and the resistor 332 unstable. In contrast, with the transistors 302 and 309, if the input voltage becomes close or equal to zero, the current flowing through the resistor 332 also becomes very small or even zero. But the current flowing through the transistor 301 is at least as large as $N \times I_{offset}$ as shown in Equation 2. N is the current ratio of the mirror transistors 309 and 310. $N \times I_{offset}$ ensures that the transistor 301 has sufficient transconductance to maintain the feedback loop stable. Additionally, the cascade transistor 302 provides level shifting, which ensures that the sufficient drain voltage for the transistor 309 even when the input voltage becomes very small or even zero.

Figure 6:
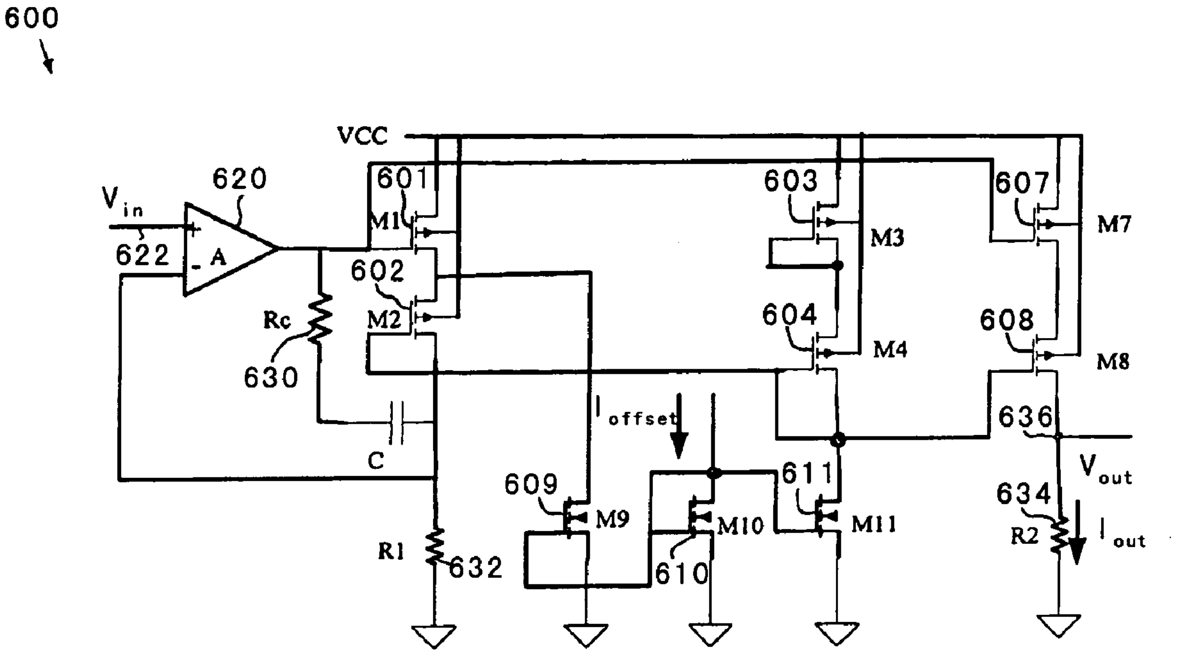
FIG. 6 is a simplified system for processing analog voltage according to another embodiment of the present invention.

FIG. 6 is a simplified system for processing analog voltage according to another embodiment of the present invention. This diagram is merely an example, which should not unduly limit the scope of the claims. One of ordinary skill in the art would recognize many variations, alternatives, and modifications. The system 600 includes transistors 601, 602, 603, 604, 607, 608, 609, 610, and 611, an operational amplifier 620, resistors 630, 632, and 634. Although the above has been shown using a selected group of components for the system 600, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and more particularly below.

An input analog voltage signal 622 is received by the operational amplifier 620. For example, $V_{in}$ represents the input analog voltage signal 622. As shown in FIG. 6, the input analog voltage signal 622 is converted to a current signal by at least the operational amplifier 620, the resistor 632, and the transistors 601 and 602. For example, a current flowing through the transistor 601 is $$I_1 = \frac{V_{in}}{R_1} + N \times I_{offset} \quad \text{(Equation 9)}$$

where $I_1$ represents the current flowing through the transistor 601, and $R_1$ represents the resistance of the resistor 632. Additionally, $I_{offset}$ represents an offset current received by the transistor 610. For example, the offset current is generated by the system 400. In another example, the offset current is generated by a reference voltage and a resistor. According to an embodiment, the offset current received by the transistor 610 is mirrored to the transistor 609. N is the current ratio of the mirror transistors 609 and 610.

As shown in FIG. 6, the current that flows through the transistor 601 is mirrored to the transistor 607 based on a current ratio between the mirror transistors 607 and 601. The current flowing through the transistor 607 is provided to the resistor 634. For example, the current $I_{out}$ flowing through the resistor 634 is:

$$I_{out} = \frac{1}{R_1} V_{in} + N \times I_{offset} \quad \text{(Equation 10)}$$

As shown in FIG. 6, the output current $I_{out}$ is converted to an output voltage by the resistor 634. Accordingly, $$V_{out} = \frac{R_2}{R_1} V_{in} + R_2 \times N \times I_{offset} \quad \text{(Equation 11)}$$

where $V_{out}$ represents the output voltage at a node 636, and $R_2$ represents the resistance of the resistor 634. For example, the output voltage is received by a dimming controller, which is a part of a driver system for one or more cold-cathode fluorescent lamps (CCFLs).

As shown in FIG. 6, according to another embodiment of the present invention, a system for processing analog voltage includes a voltage-to-current converter configured to receive an input analog voltage signal and generate a first current signal. The voltage-to-current converter includes a first transistor, and the first transistor includes a first source and a first drain and is associated with a first current flowing between the first source and the first drain. Additionally, the system includes a first current mirror configured to receive a predetermined current and generate a second current. The second current is proportional to the predetermined current, and the first current is equal to a sum of the second current and the first current signal. Moreover, the system includes a second current mirror configured to receive the first current and generate a third current. The third current is proportional to the first current. Also, the system includes a current-to-voltage converter configured to receive the third current and generate an output analog voltage signal.

For example, the voltage-to-current converter includes a second transistor, and the second transistor includes a second source and a second drain. One of the first source and the first drain and one of the second source and the second drain are connected at a first node. In another example, the first transistor and the second transistor are connected to the first current mirror at the first node. In yet another example, the system further includes a dimming controller configured to receive the output analog voltage signal and generate a control signal for driving at least a cold-cathode fluorescent lamp.

In yet another example, the voltage-to-current converter, the first current mirror, the second current mirror, and the current-to-voltage converter are configured to be biased between a first power supply voltage level and a second power supply voltage level. The input analog voltage ranges from the first power supply voltage level to the second power supply voltage level, and the output analog voltage signal ranges from a first output voltage level to a second output voltage level. The output analog voltage signal equals a sum of a first predetermined constant and a product of a second predetermined constant and the input analog voltage signal. The first output voltage level corresponds to the first power supply voltage level based on at least information associated with the first predetermined constant and the second predetermined constant, and the second output voltage level corresponds to the second power supply voltage level based on at least information associated with the first predetermined constant and the second predetermined constant. In yet another example, the first power supply voltage level is equal to zero volt. In yet another example, the voltage-to-current converter, the first current mirror, the second current mirror, the third current mirror, and the current-to-voltage converter are coupled to a single power supply, and the signal power supply is configured to provide the first power supply voltage level and the second power supply voltage level. In yet another example, the output analog voltage signal is proportional to the third current.

As shown in FIG. 6, according to yet another embodiment of the present invention, a method for processing analog voltage includes receiving an input analog voltage signal and converting the input analog voltage signal to a first current signal. Additionally, the method includes receiving a predetermined current, and generating a first current based on at least information associated with the predetermined current. The first current is proportional to the predetermined current. Moreover, the method includes processing information associated with the first current and the first current signal, generating a second current equal to a sum of the first current and the first current signal, receiving the second current, and generating a third current based on at least information associated with the second current. The third current is proportional to the second current. Also, the method includes receiving the third current, and converting the third current to an output analog voltage signal.

Figure 7:
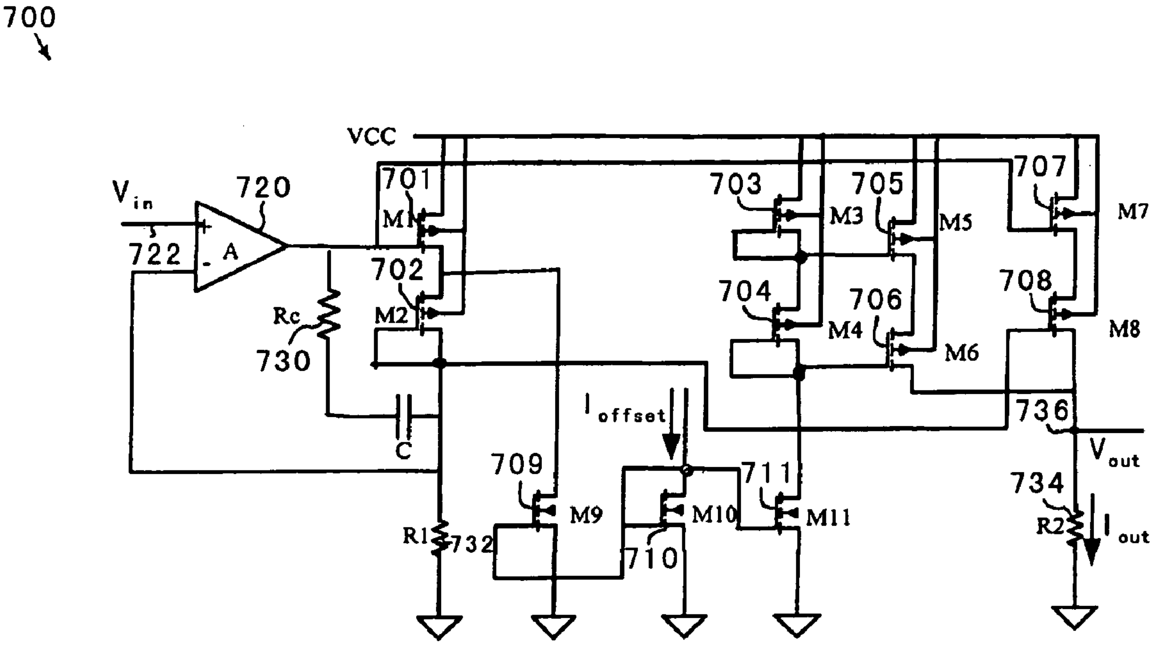
FIG. 7 is a simplified system for processing analog voltage according to yet another embodiment of the present invention.

FIG. 7 is a simplified system for processing analog voltage according to yet another embodiment of the present invention. This diagram is merely an example, which should not unduly limit the scope of the claims. One of ordinary skill in the art would recognize many variations, alternatives, and modifications. The system 700 includes transistors 701, 702, 703, 704, 705, 706, 707, 708, 709, 710, and 711, an operational amplifier 720, resistors 730, 732, and 734. Although the above has been shown using a selected group of components for the system 700, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and more particularly below.

An input analog voltage signal 722 is received by the operational amplifier 720. For example, $V_{in}$ represents the input analog voltage signal 722. As shown in FIG. 7, the input analog voltage signal 722 is converted to a current signal by at least the operational amplifier 720, the resistor 732, and the transistors 701 and 702. For example, a current flowing through the transistor 701 is $$I_1 = \frac{V_{in}}{R_1} + N \times I_{offset} \quad \text{(Equation 12)}$$

where $I_1$ represents the current flowing through the transistor 701, and $R_1$ represents the resistance of the resistor 732. Additionally, $I_{offset}$ represents an offset current received by the transistor 710. For example, the offset current is generated by the system 400. In another example, the offset current is generated by a reference voltage and a resistor. According to an embodiment, the offset current received by the transistor 710 is mirrored to the transistor 709. N is the current ratio of the mirror transistors 709 and 710.

As shown in FIG. 7, the current that flows through the transistor 701 is mirrored to the transistor 707 based on a current ratio between the mirror transistors 707 and 701. Additionally, the offset current is mirrored from the transistor 710 to the transistor 705. For example, the offset current is mirrored from the transistor 710 to the transistor 711. The current flowing through the transistor 711 is the same as the current flowing through the transistor 703. Moreover, the current flowing through the transistor 703 is mirrored to the transistor 705.

The current flowing through the transistor 705 and the current flowing through the transistor 707 both are provided to the resistor 734. For example, the sum $I_{out}$ of these two currents is:

$$I_{out} = \frac{1}{R_1} V_{in} + M \times I_{offset} \quad \text{(Equation 13)}$$

where $I_{out}$ represents the output current flowing through the resistor 734. Additionally, M represents a current gain factor. For example, the current gain factor depends on at least the current ratio of the mirror transistors 709 and 710 and the current ratio of the mirror transistors 705 and 710. In another example, the current ratio of the mirror transistors 705 and 710 depends on at least the current ratio of the mirror transistors 711 and 710 and the current ratio of the mirror transistors 705 and 703.

As shown in FIG. 7, the output current $I_{out}$ is converted to an output voltage by the resistor 734. Accordingly, for example, $$V_{out} = \frac{R_2}{R_1} V_{in} + R_2 \times M \times I_{offset} \quad \text{(Equation 14)}$$

where $V_{out}$ represents the output voltage at a node 736, and $R_2$ represents the resistance of the resistor 734. For example, the output voltage is received by a dimming controller, which is a part of a driver system for one or more cold-cathode fluorescent lamps (CCFLs).

According to an embodiment, the gate of the transistor 702 is connected to the drain of the transistor 702 and the gate of the transistor 708. Additionally, the gate and the drain of the transistor 704 both are connected to the gate of the transistor 706. The drain of the transistor 706 and the drain of the transistor 708 are connected to the node 736. As discussed above and further emphasized here, this arrangement is merely an example, which should not unduly limit the scope of the claims. One of ordinary skill in the art would recognize many variations, alternatives, and modifications.

As shown in FIG. 3 and/or FIG. 7, according to another embodiment of the present invention, a system for processing analog voltage includes a voltage-to-current converter configured to receive an input analog voltage signal and generate a first current signal. The voltage-to-current converter includes a first transistor, and the first transistor includes a first source and a first drain and is associated with a first current flowing between the first source and the first drain. Additionally, the system includes a first current mirror configured to receive a predetermined current and generate a second current. The second current is proportional to the predetermined current, and the first current is equal to a sum of the second current and the first current signal. Moreover, the system includes a second current mirror configured to receive the first current and generate a third current. The third current is proportional to the first current. Also, the system includes a third current mirror configured to receive the predetermined current and generate a fourth current. The fourth current is proportional to the predetermined current. Additionally, the system includes a current-to-voltage converter configured to receive the third current and the fourth current and generate an output analog voltage signal.

For example, the voltage-to-current converter includes a second transistor, and the second transistor includes a second source and a second drain. One of the first source and the first drain and one of the second source and the second drain are connected at a first node. In another example, the first transistor and the second transistor are connected to the first current mirror at the first node. In yet another example, the third current mirror includes a fourth current mirror and a fifth current mirror. The fourth current mirror is configured to receive the predetermined current and generate a fifth current, and the fifth current is proportional to the predetermined current. The fifth current mirror is configured to receive the fifth current and generate the fourth current, and the fourth current is proportional to the fifth current. In yet another example, the system further includes a dimming controller configured to receive the output analog voltage signal and generate a control signal for driving at least a cold-cathode fluorescent lamp.

In yet another example, the voltage-to-current converter, the first current mirror, the second current mirror, the third current mirror, and the current-to-voltage converter are configured to be biased between a first power supply voltage level and a second power supply voltage level. The input analog voltage ranges from the first power supply voltage level to the second power supply voltage level, and the output analog voltage signal ranges from a first output voltage level to a second output voltage level. The output analog voltage signal equals a sum of a first predetermined constant and a product of a second predetermined constant and the input analog voltage signal. The first output voltage level corresponds to the first power supply voltage level based on at least information associated with the first predetermined constant and the second predetermined constant, and the second output voltage level corresponds to the second power supply voltage level based on at least information associated with the first predetermined constant and the second predetermined constant. In yet another example, each of the first power supply voltage level and the second power supply voltage level is a DC voltage level. The first power supply voltage level is equal to zero volt. In yet another example, each of the first predetermined constant and the second predetermined constant is not equal to zero. In yet another example, the voltage-to-current converter, the first current mirror, the second current mirror, the third current mirror, and the current-to-voltage converter are coupled to a single power supply, and the signal power supply is configured to provide the first power supply voltage level and the second power supply voltage level. In yet another example, the output analog voltage signal is proportional to a sum of the third current and the fourth current. In yet another example, the predetermined current is a DC current. In yet another example, the first current signal is proportional to the input analog voltage signal in magnitude.

As shown in FIG. 3 and/or FIG. 7, according to yet another embodiment of the present invention, a method for processing analog voltage includes receiving an input analog voltage signal, and converting the input analog voltage signal to a first current signal. Additionally, the method includes receiving a predetermined current, and generating a first current based on at least information associated with the predetermined current. The first current is proportional to the predetermined current. Moreover, the method includes processing information associated with the first current and the first current signal, generating a second current equal to a sum of the first current and the first current signal, receiving the second current, and generating a third current based on at least information associated with the second current. The third current is proportional to the second current. Also, the method includes generating a fourth current based on at least information associated with the predetermined current, and the fourth current is proportional to the predetermined current. Additionally, the method includes receiving the third current and the fourth current, generating a fifth current equal to a sum of the third current and the fourth current, and converting the fifth current to an output analog voltage signal.

The present invention has various advantages. Certain embodiments of the present invention provide a system and method for processing a voltage analog signal by performing the level shifting and manipulation in current domain. Some embodiments of the present invention can improve precision of analog level shifting and manipulation. Certain embodiments of the present invention can be used for analog signal processing in integrated analog circuitry. For example, the present invention is applied to dimming control in a CCFL backlight driver system. As another example, the dimming control is analog dimming control. Some embodiments of the present invention can be utilized for many applications in which analog voltage level shifting and processing is applied.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for processing analog voltage for cold-cathode fluorescent lamp, the system comprising:

- a voltage-to-current converter configured to receive an input analog voltage signal and generate a first current signal;
- a current processing component configured to receive the first current signal and a predetermined current and generate a second current signal;
- a current-to-voltage converter configured to receive the second current signal and generate an output analog voltage signal;
- a dimming controller configured to receive the output analog voltage signal and generate a control signal for driving at least a cold-cathode fluorescent lamp;

wherein:

the voltage-to-current converter, the current processing component, and the current-to-voltage converter are configured to be biased between a first power supply voltage level and a second power supply voltage level;

the input analog voltage ranges from the first power supply voltage level to the second power supply voltage level;

the output analog voltage signal ranges from a first output voltage level to a second output voltage level;

the output analog voltage signal equals a sum of a first predetermined constant and a product of a second predetermined constant and the input analog voltage signal;

the first output voltage level corresponds to the first power supply voltage level based on at least information associated with the first predetermined constant and the second predetermined constant;

the second output voltage level corresponds to the second power supply voltage level based on at least information associated with the first predetermined constant and the second predetermined constant.

2. The system of claim 1 wherein each of the first power supply voltage level and the second power supply voltage level is a DC voltage level.

3. The system of claim 2 wherein the first power supply voltage level is equal to zero volt.

4. The system of claim 1 wherein each of the first predetermined constant and the second predetermined constant is not equal to zero.

5. The system of claim 1 wherein the voltage-to-current converter, the current processing component, and the current-to-voltage converter are coupled to a single power supply, the signal power supply being configured to provide the first power supply voltage level and the second power supply voltage level.

6. The system of claim 1 wherein the second current signal is equal to a sum of the first current signal and the predetermined current.

7. The system of claim 1 wherein the predetermined current is a DC current.

8. The system of claim 1 wherein the first current signal is proportional to the input analog voltage signal in magnitude.

9. The system of claim 1 wherein the output analog voltage signal is proportional to the second current signal in magnitude.

10. A system for processing analog voltage, the system comprising:

a voltage-to-current converter configured to receive an input analog voltage signal and generate a first current signal, the voltage-to-current converter including a first transistor, the first transistor including a first source and a first drain and being associated with a first current flowing between the first source and the first drain;

a first current mirror configured to receive a predetermined current and generate a second current, the second current being proportional to the predetermined current, the first current being equal to a sum of the second current and the first current signal;

a second current mirror configured to receive the first current and generate a third current, the third current being proportional to the first current;

a third current mirror configured to receive the predetermined current and generate a fourth current, the fourth current being proportional to the predetermined current;

a current-to-voltage converter configured to receive the third current and the fourth current and generate an output analog voltage signal.

11. The system of claim 10 wherein:

the voltage-to-current converter includes a second transistor;

the second transistor includes a second source and a second drain;

one of the first source and the first drain and one of the second source and the second drain are connected at a first node.

12. The system of claim 11 wherein the first transistor and the second transistor are connected to the first current mirror at the first node.

13. The system of claim 10 wherein:

the third current mirror includes a fourth current mirror and a fifth current mirror;

the fourth current mirror configured to receive the predetermined current and generate a fifth current, the fifth current being proportional to the predetermined current;

the fifth current mirror configured to receive the fifth current and generate the fourth current, the fourth current being proportional to the fifth current.

14. The system of claim 10, and further comprising:

a dimming controller configured to receive the output analog voltage signal and generate a control signal for driving at least a cold-cathode fluorescent lamp.

15. The system of claim 10 wherein:

the voltage-to-current converter, the first current mirror, the second current mirror, the third current mirror, and the current-to-voltage converter are configured to be biased between a first power supply voltage level and a second power supply voltage level;

the input analog voltage ranges from the first power supply voltage level to the second power supply voltage level;

the output analog voltage signal ranges from a first output voltage level to a second output voltage level;

the output analog voltage signal equals a sum of a first predetermined constant and a product of a second predetermined constant and the input analog voltage signal;

the first output voltage level corresponds to the first power supply voltage level based on at least information associated with the first predetermined constant and the second predetermined constant;

the second output voltage level corresponds to the second power supply voltage level based on at least information associated with the first predetermined constant and the second predetermined constant.

16. The system of claim 15 wherein each of the first power supply voltage level and the second power supply voltage level is a DC voltage level.

17. The system of claim 16 wherein the first power supply voltage level is equal to zero volt.

18. The system of claim 15 wherein each of the first predetermined constant and the second predetermined constant is not equal to zero.

19. The system of claim 15 wherein the voltage-to-current converter, the first current mirror, the second current mirror, the third current mirror, and the current-to-voltage converter are coupled to a single power supply, the signal power supply being configured to provide the first power supply voltage level and the second power supply voltage level.

20. The system of claim 10 wherein the output analog voltage signal is proportional to a sum of the third current and the fourth current.

21. The system of claim 10 wherein the predetermined current is a DC current.

22. The system of claim 10 wherein the first current signal is proportional to the input analog voltage signal in magnitude.

23. A system for processing analog voltage, the system comprising:

a voltage-to-current converter configured to receive an input analog voltage signal and generate a first current signal, the voltage-to-current converter including a first transistor, the first transistor including a first source and a first drain and being associated with a first current flowing between the first source and the first drain;

a first current mirror configured to receive a predetermined current and generate a second current, the second current being proportional to the predetermined current, the first current being equal to a sum of the second current and the first current signal;

a second current mirror configured to receive the first current and generate a third current, the third current being proportional to the first current;

a current-to-voltage converter configured to receive the third current and generate an output analog voltage signal.

24. The system of claim 23 wherein:

the voltage-to-current converter includes a second transistor;

the second transistor includes a second source and a second drain;

one of the first source and the first drain and one of the second source and the second drain are connected at a first node.

25. The system of claim 24 wherein the first transistor and the second transistor are connected to the first current mirror at the first node.

26. The system of claim 23, and further comprising:

a dimming controller configured to receive the output analog voltage signal and generate a control signal for driving at least a cold-cathode fluorescent lamp.

27. The system of claim 23 wherein:

the voltage-to-current converter, the first current mirror, the second current mirror, and the current-to-voltage converter are configured to be biased between a first power supply voltage level and a second power supply voltage level;

the input analog voltage ranges from the first power supply voltage level to the second power supply voltage level;

the output analog voltage signal ranges from a first output voltage level to a second output voltage level;

the output analog voltage signal equals a sum of a first predetermined constant and a product of a second predetermined constant and the input analog voltage signal;

the first output voltage level corresponds to the first power supply voltage level based on at least information associated with the first predetermined constant and the second predetermined constant;

the second output voltage level corresponds to the second power supply voltage level based on at least information associated with the first predetermined constant and the second predetermined constant.

28. The system of claim 23 wherein the first power supply voltage level is equal to zero volt.

29. The system of claim 23 wherein the voltage-to-current converter, the first current mirror, the second current mirror, the third current mirror, and the current-to-voltage converter are coupled to a single power supply, the signal power supply being configured to provide the first power supply voltage level and the second power supply voltage level.

30. The system of claim 23 wherein the output analog voltage signal is proportional to the third current.

31. A method for processing analog voltage for cold-cathode fluorescent lamp, the method comprising:

receiving an input analog voltage signal;

converting the input analog voltage signal into a first current signal;

receiving the first current signal and a predetermined current;

processing information associated with the first current signal and the predetermined current;

generating a second current signal based on at least information associated with the first current signal and the predetermined current;

receiving the second current signal;

converting the second current signal to an output analog voltage signal;

receiving the output analog voltage signal;

generating a dimming control signal for driving at least a cold-cathode fluorescent lamp;

wherein:

the converting the input analog voltage signal into a first current signal, the processing information associated with the first current signal and the predetermined current, and the converting the second current signal to an output analog voltage signal are performed by using a first power supply voltage level and a second power supply voltage level;

the input analog voltage ranges from the first power supply voltage level to the second power supply voltage level;

the output analog voltage signal ranges from a first output voltage level to a second output voltage level;

the output analog voltage signal equals a sum of a first predetermined constant and a product of a second predetermined constant and the input analog voltage signal;

the first output voltage level corresponds to the first power supply voltage level based on at least information associated with the first predetermined constant and the second predetermined constant;

the second output voltage level corresponds to the second power supply voltage level based on at least information associated with the first predetermined constant and the second predetermined constant.

32. A method for processing analog voltage, the method comprising:

receiving an input analog voltage signal;

converting the input analog voltage signal to a first current signal;

receiving a predetermined current;

generating a first current based on at least information associated with the predetermined current, the first current being proportional to the predetermined current;

processing information associated with the first current and the first current signal;

generating a second current equal to a sum of the first current and the first current signal;

receiving the second current;

generating a third current based on at least information associated with the second current, the third current being proportional to the second current;

generating a fourth current based on at least information associated with the predetermined current, the fourth current being proportional to the predetermined current;

receiving the third current and the fourth current;

generating a fifth current equal to a sum of the third current and the fourth current;

converting the fifth current to an output analog voltage signal.

33. A method for processing analog voltage, the method comprising:

receiving an input analog voltage signal;

converting the input analog voltage signal to a first current signal;

receiving a predetermined current;

generating a first current based on at least information associated with the predetermined current, the first current being proportional to the predetermined current;

processing information associated with the first current and the first current signal;

generating a second current equal to a sum of the first current and the first current signal;

receiving the second current;

generating a third current based on at least information associated with the second current, the third current being proportional to the second current;

receiving the third current;

converting the third current to an output analog voltage signal.

* * * * *